(12) United States Patent
Brown et al.

(10) Patent No.: US 10,627,092 B2
(45) Date of Patent: Apr. 21, 2020

(54) VEHICLE GRILLE ASSEMBLY

(71) Applicant: Ford Global Technologies, LLC, Dearborn, MI (US)

(72) Inventors: LaRon Michelle Brown, Detroit, MI (US); Prashant Dubey, Canton, MI (US); David Brian Glickman, Southfield, MI (US); Paul Kenneth Dellock, Northville, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 15/911,548

(22) Filed: Mar. 5, 2018

(65) Prior Publication Data

US 2019/0271458 A1  Sep. 5, 2019

(51) Int. Cl.
| | | |
|---|---|---|
| *F21V 17/10* | (2006.01) | |
| *F21V 29/50* | (2015.01) | |
| *F24F 13/078* | (2006.01) | |
| *B60Q 1/28* | (2006.01) | |

(52) U.S. Cl.
CPC ............... *F21V 29/50* (2015.01); *B60Q 1/28* (2013.01); *F21V 17/10* (2013.01); *F24F 13/078* (2013.01)

(58) Field of Classification Search
CPC ........ F21V 29/50; F21V 17/10; F24F 13/078; B60Q 1/00; B60Q 1/0017; B60Q 1/0023; B60Q 1/26; B60Q 1/2619; B60Q 1/2661; B60Q 1/50; B60Q 1/503
See application file for complete search history.

(56) References Cited

U.S. PATENT DOCUMENTS

| | | | |
|---|---|---|---|
| 2,486,859 | A | 11/1949 | Meijer et al. |
| 4,816,968 | A * | 3/1989 | Yamada .................. B60Q 1/28 |
| | | | 362/268 |
| 5,053,930 | A | 10/1991 | Benavides |
| 5,434,013 | A | 7/1995 | Fernandez |
| 5,709,453 | A * | 1/1998 | Krent .................. B60Q 1/0011 |
| | | | 362/496 |
| 5,839,718 | A | 11/1998 | Hase et al. |
| 6,031,511 | A | 2/2000 | DeLuca et al. |
| 6,117,362 | A | 9/2000 | Yen et al. |
| 6,294,990 | B1 | 9/2001 | Knoll et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Bao Q Truong
(74) *Attorney, Agent, or Firm* — David Coppiellie; Price Heneveld LLP

(57) ABSTRACT

A vehicle grille assembly is provided herein. The grille assembly includes a panel sealingly coupled to a substrate and defining a cavity therebetween. A light source is disposed within the cavity. A diffuser is disposed between the light source and a portion of the panel.

19 Claims, 9 Drawing Sheets

(56) References Cited

U.S. PATENT DOCUMENTS

| | | | |
|---|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,147,355 B1* | 12/2006 | Kiler .................. B60Q 1/2661 |
| | | 362/496 |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,825,600 B2 | 11/2010 | Stam et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Crespo |
| 9,499,113 B2* | 11/2016 | Salter .................. B60R 19/52 |
| 9,568,659 B2 | 2/2017 | Verger et al. |
| 9,586,518 B2* | 3/2017 | Salter ................ B60Q 1/2661 |
| 9,587,952 B1 | 3/2017 | Slusar |
| 9,616,812 B2 | 4/2017 | Sawayanagi |
| 9,616,823 B1* | 4/2017 | Salter ................ B60R 13/005 |
| 9,714,749 B1* | 7/2017 | Salter .................... F21S 43/50 |
| 9,718,405 B1 | 8/2017 | Englander et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1* | 4/2005 | Babbitt .............. G02B 6/0003 |
| | | 385/146 |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0058382 A1* | 3/2007 | Lan .................... B60Q 1/2661 |
| | | 362/487 |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0314503 A1 | 11/2013 | Nix et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0138807 A1* | 5/2015 | Salter ................ B60Q 1/2661 |
| | | 362/510 |
| 2015/0267881 A1 | 9/2015 | Salter et al. |
| 2015/0307033 A1* | 10/2015 | Preisler .................. B60R 13/02 |
| | | 362/488 |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0144710 A1* | 5/2017 | Frayer ................ B62D 25/082 |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| CN | 206067605 U | 4/2017 |
| DE | 4120677 A1 | 1/1992 |

(56) References Cited

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |
| WO | 2017139740 A1 | 8/2017 |

\* cited by examiner

US 10,627,092 B2

VEHICLE GRILLE ASSEMBLY

FIELD OF THE INVENTION

The present disclosure generally relates to vehicle grille assemblies, and more particularly, to illuminated vehicle grille assemblies.

BACKGROUND OF THE INVENTION

Exterior vehicle lighting applications continue to grow in popularity. Accordingly, a vehicle grille assembly is provided herein that is operable to provide functional lighting as well as impart a stylistic element to a vehicle.

SUMMARY OF THE INVENTION

According to one aspect of the present disclosure, a vehicle grille assembly is provided herein. The vehicle grille assembly includes a panel coupled to a substrate and defining a cavity therebetween. A light source is disposed within the cavity. A diffuser is disposed between the light source and a portion of the panel.

According to another aspect of the present disclosure, a vehicle grille assembly is provided herein. The vehicle grille assembly includes a panel sealingly coupled to a substrate and defining a cavity therebetween. A matrix of light sources is disposed within the cavity configured to illuminate various messages. A diffuser is disposed between the light source and a portion of the panel.

According to yet another aspect of the present disclosure, a method of making a grille assembly is provided herein. The method includes molding a panel that is formed from a polymeric, translucent material. The method also includes fixing a matrix of light sources along the panel. The method further includes overmolding a substrate over the panel, the substrate and the panel at least partially sealing the matrix of light sources therebetween.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
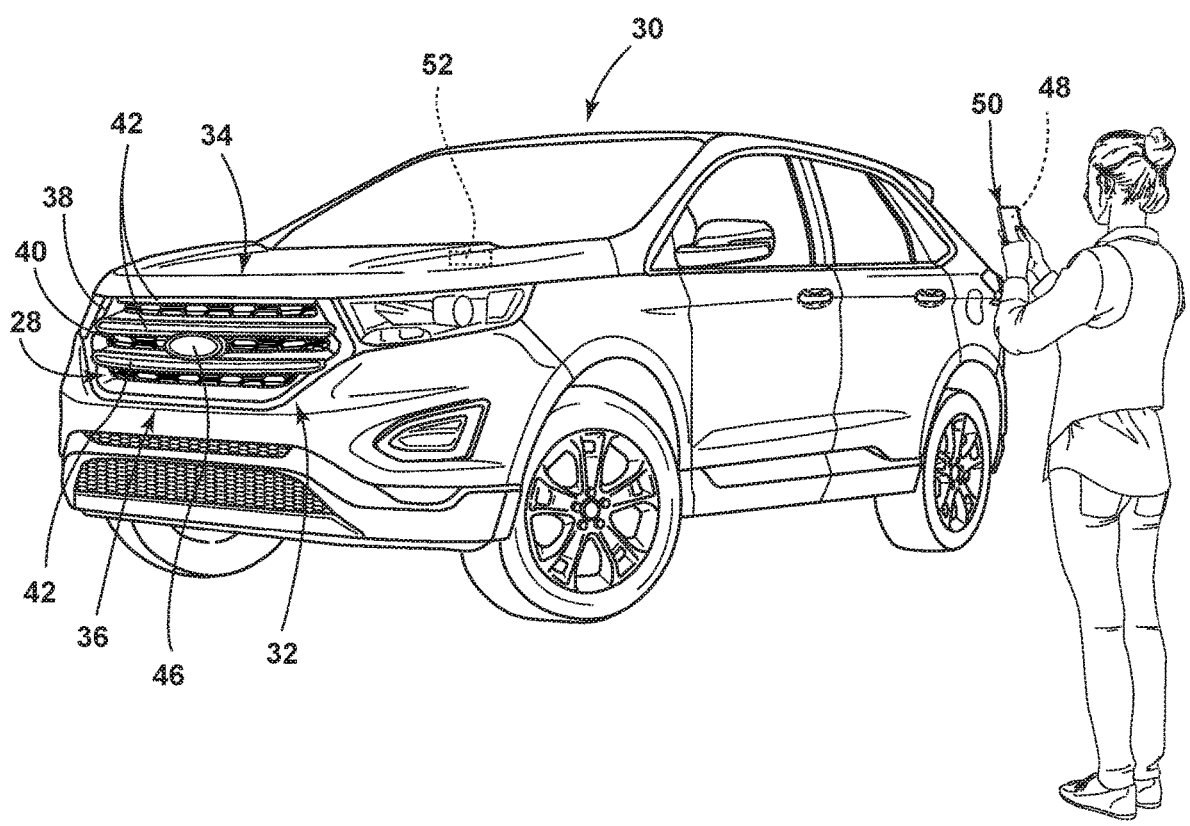
FIG. 2 is a front perspective view of an automotive vehicle with an illuminated grille assembly, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a grille assembly that may be illuminated for a wide range of purposes. In some examples, the grille assembly may be illuminated to provide messages and/or information to onlookers of the vehicle. The grille assembly may also be illuminated to provide additional light to a user of the vehicle and/or a user of any feature of the vehicle, such as a camera disposed on the vehicle. The grille assembly may include a substrate and a panel that are sealingly coupled to one another through a multi-step molding process. The grille assembly may be operably coupled with phosphorescent and/or luminescent structures to luminesce in response to predefined events. The luminescent structures may be configured to convert emitted light received from an associated light source and re-emit the light at a different wavelength generally found in the visible spectrum.

Figure 1A:
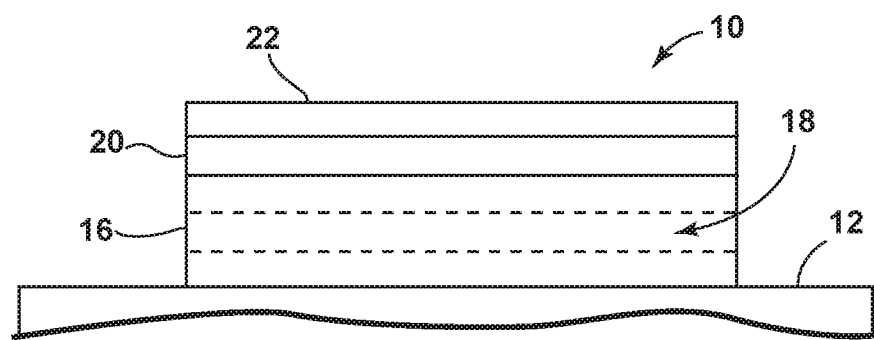
FIG. 1A is a side view of a luminescent structure rendered as a coating, according to some examples.
Figure 1B:
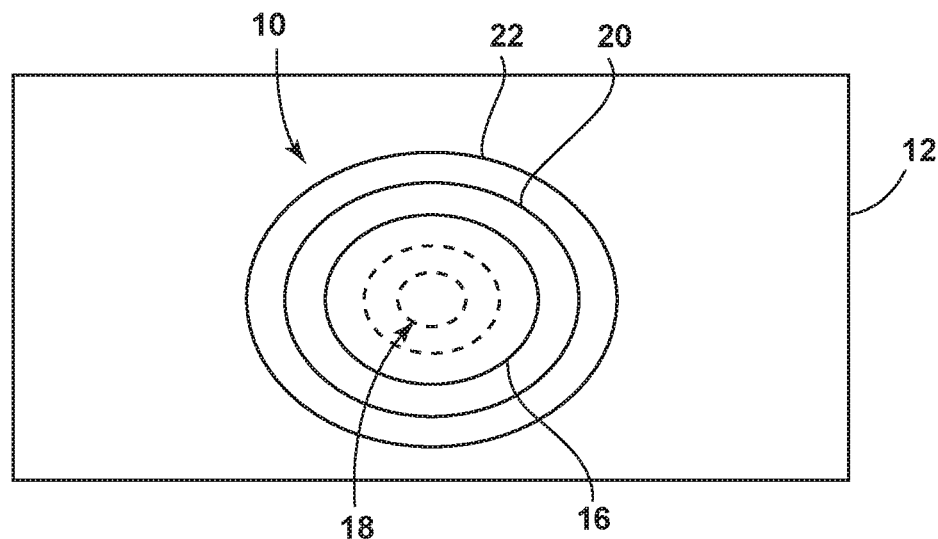
FIG. 1B is a top view of a luminescent structure rendered as a discrete particle, according to some examples.
Figure 1C:
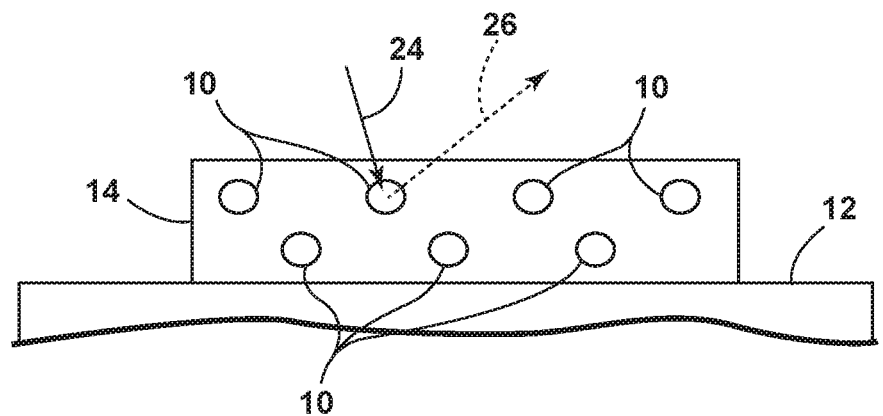
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer-wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

Figure 4:
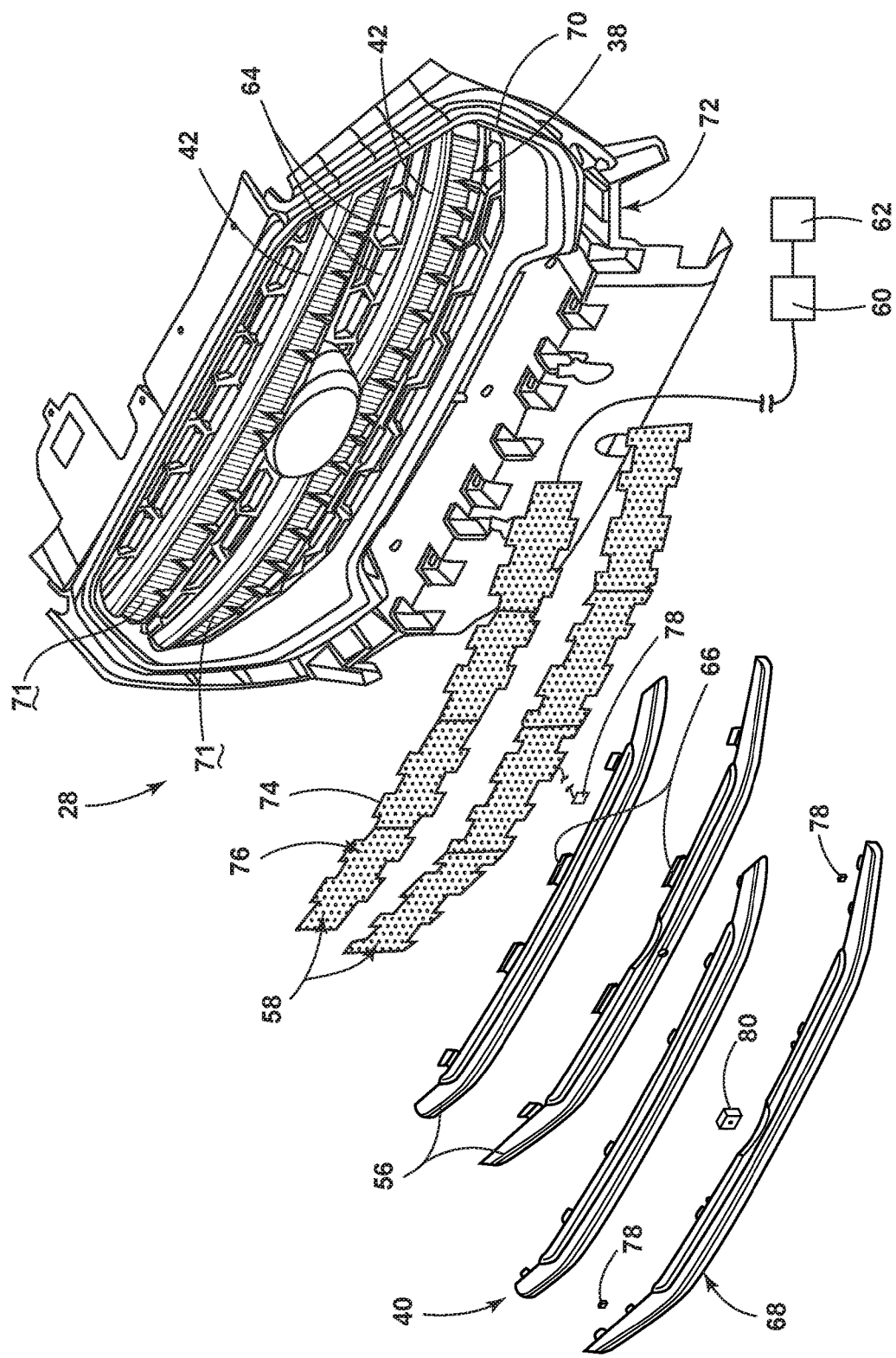
FIG. 4 is a front perspective, exploded view of the illuminated grille assembly, according to some examples.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue emitted light 24 emanated from light sources 58 (FIG. 4). According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light sources 58). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various examples, may be operable to emit light at or above an intensity of 0.32 $mcd/m^2$ after a period of 10 minutes. Additionally, the long-persistence luminescent material 18 may be operable to emit light above or at an intensity of 0.32 $mcd/m^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources 58 that emit the emitted light 24, including, but not limited to, natural light sources (e.g., the sun) and/or any artificial light sources 58. The periodic absorption of the emitted light 24 from any excitation source may provide for a substantially sustained charge of the long-persistence luminescent material 18 to provide for consistent passive illumination. In various examples, a light sensor 132 (FIG. 9) may monitor the illumination intensity of the luminescent structure 10 and actuate an excitation source when the illumination intensity falls below 0.32 $mcd/m^2$, or any other predefined intensity level.

The long-persistence luminescent material 18 may correspond to alkaline earth aluminates and silicates, for example, doped di-silicates, or any other compound that is capable of emitting light for a period of time once the emitted light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the emitted light 24 and d-d transitions of Mn2+ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Referring to FIG. 2, a grille assembly 28 of a vehicle 30 is generally supported on a front body structure 32 of the vehicle 30. The grille assembly 28 is generally positioned between a hood 34 and a bumper assembly 36. In some examples, the grille assembly 28 includes a substrate 38 and one or more panels 40 extending along the substrate 38. The panel 40 and the substrate 38 together define intake ports 42 between the respective panels 40. The grille may further include vanes 44 (FIG. 3) disposed between the panels 40 that further impart a style to the grille assembly 28. An intake port 42 may also be provided between the grille 12 and the front bumper assembly 36 and/or the hood 34. The grille assembly 28 may be planar or arcuate to impart a linear or non-linear contour to the front body structure 32 of the vehicle 30. The grille assembly 28 may also include an emblem 46 affixed to the front of the grille assembly 28. As will be described herein in greater detail, portions of the grille assembly 28 may have a metallic appearance and be capable of illuminating to provide functional lighting as well as impart a stylistic element to the vehicle 30. According to some examples, the grille assembly 28 may illuminate to provide various notifications and messages to onlookers of the vehicle 30.

With further reference to FIG. 2, the vehicle 30 may be utilized for personal and/or commercial purposes, such as for ride-providing (chauffeuring) services and/or ride-sharing services. An application 48 associated with the commercial purpose of the vehicle 30 may be installed on a user's electronic device 50. The application 48 may be configured to communicate with the vehicle 30 (either directly and/or through a remote station) and/or a vehicle-associated electronic device 52 that may be disposed within the vehicle 30 and/or remotely disposed. Through the communication between the user's electronic device 50 and the vehicle-associated electronic device 52, a commercial relationship may be established in which the vehicle 30 is used to facilitate a service. In some examples, the vehicle-associated electronic device 52 may be configured as a body control module (BCM) 140 (FIG. 9) or an engine control unit (ECU).

The user's electronic device 50 and the vehicle-associated electronic device 52 may be any one of a variety of computing devices and may include a processor and memory. For example, the user's electronic device 50 and the vehicle-associated electronic device 52 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols. Further, the vehicle-associated electronic device 52 may be a computer or any other electronic device that is disposed within the vehicle 30.

In various examples, the vehicle 30 and/or the vehicle-associated electronic device 52 may communicate with the user's electronic device 50 through a wireless network. Accordingly, the network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks including a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The application 48 may be configured to utilize a device link interface to interact with the vehicle 30 and/or the vehicle-associated electronic device 52. When connected to the vehicle 30, the application 48 may be configured to utilize information from vehicle sensors, actuators, and electronic control units. The application 48 may also be configured to operate when untethered from the vehicle 30, such as when the user is riding public transportation or walking. The application 48 may be further configured to communicate with servers via a communications network. The user may interact with the application 48 through a human-machine interface (HMI) of the vehicle-associated electronic device 52, via a web interface, or via an HMI of the vehicle 30.

With further reference to FIG. 2, the vehicle 30 may be a manually operated vehicle (i.e. using a human driver) or may be autonomously driven by an onboard computer. Additionally, or alternatively, the vehicle 30 may be remotely controlled (e.g., via an operator located in a different location). In autonomous examples, the computer may be configured for communicating with one or more remote sites such as a server via a network. The one or more remote sites may include a data store. The vehicle 30, including the computer, is configured to receive information, e.g., collected data, from the data collectors related to various components of the vehicle 30, e.g., a steering wheel, brake pedal, accelerator pedal, gearshift lever, etc. The computer generally includes an autonomous driving module that includes instructions for autonomously, i.e., without some, or any, operator input, operating the vehicle 30, including possibly in response to instructions received from the server. Further, the computer, e.g., in the module, generally includes instructions for receiving data, e.g., from one or more data collectors and/or an HMI, such as an interactive voice response (IVR) system, a graphical user interface (GUI) including a touchscreen or the like, etc.

The application 48 on the user's electronic device 50 and/or vehicle-associated electronic device 52 may also be configured to alter lighting characteristics of the grille assembly 28. For example, the color of light emitted from the grille assembly 28, the intensity of light emitted from the grille assembly 28, and various portions of the grille assembly 28 may be illuminated to notify persons proximate the vehicle 30 of any desired information, including, but not limited to, a vehicle make/model, a company utilizing the vehicle 30, a personalized notification, etc.

Figure 3:
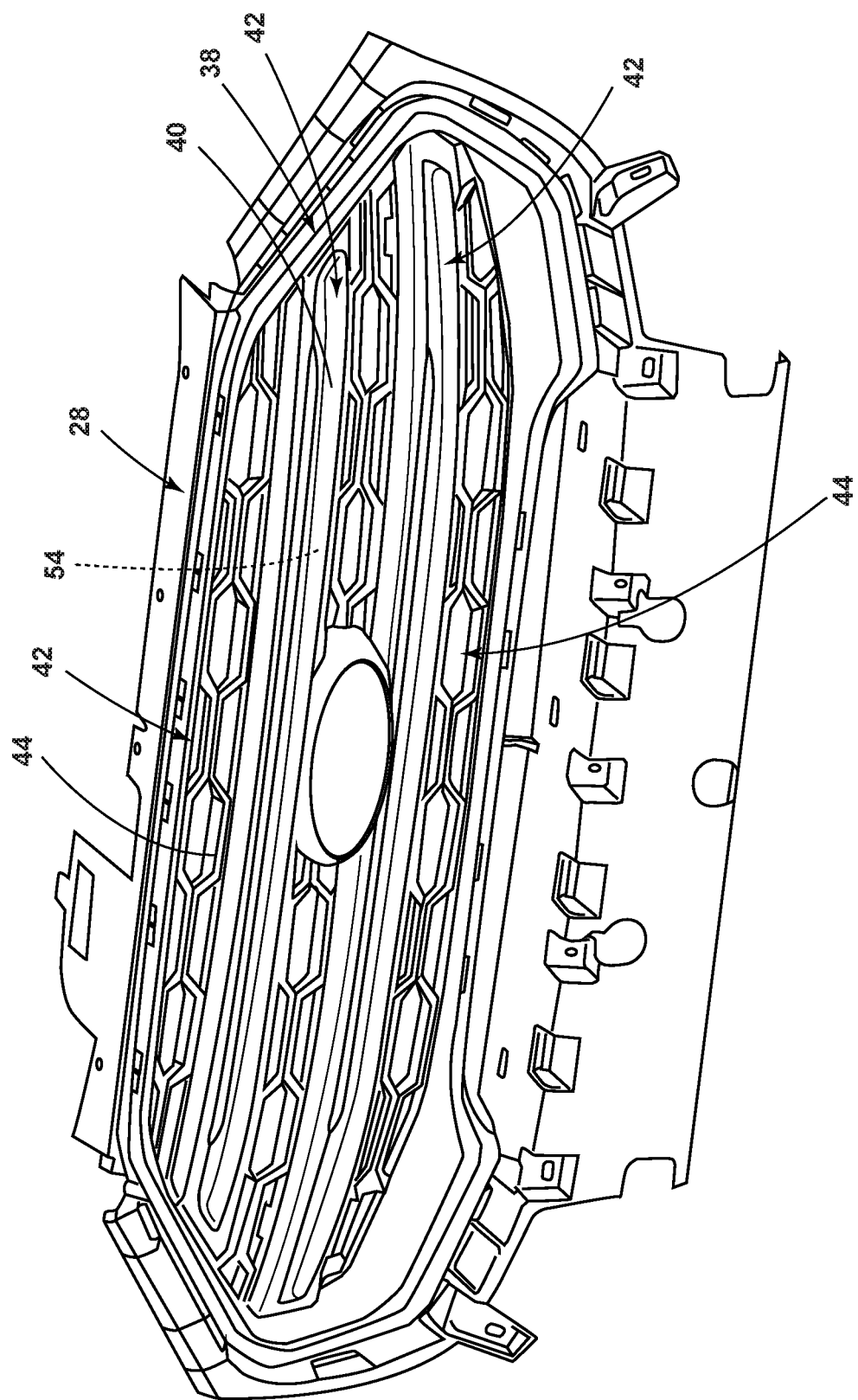
FIG. 3 is a front perspective view of the illuminated grille assembly having a pair of translucent panels extending latitudinally along a substrate, according to some examples.

Referring to FIGS. 3 and 4, the grille assembly 28 may be configured as a multilayer component that may include the panels 40, which may be integrally formed and/or otherwise coupled with the substrate 38. The panels 40 may be coupled to the substrate 38 to define a cavity 54 therebetween. A diffuser 56 and a light source 58 may be disposed between the panels 40 and the substrate 38. In some examples, a controller 60 may also be disposed within the cavity 54 that is operably coupled to a power source 62, which includes a conventional vehicle power source or an independent power source. In some instances, the panel 40 is sealingly coupled to the substrate 38 to at least partially protect any component (e.g., diffuser 56, light source 58, controller 60, etc.) disposed therebetween. As used herein, "sealingly coupled" will be construed to mean any two components that are coupled to one another and contact (possibly direct) one another. The panels 40 may be coupled to the substrate 38 through an overmolding process. In some examples, the substrate 38 may define one or more openings 64 and the panels 40 may define corresponding tabs 66. The tabs 66 are disposed within the opening 64, possibly during the overmolding process, to locate and couple the panel 40 to the substrate 38 in a desired position.

The substrate 38 may be formed from a polymeric material, an elastomeric material, a metallic material, combinations thereof, and/or any other material known in the art to form the substrate 38. The polymeric materials include thermoplastic and thermosetting polymeric materials, e.g., silicones, acrylics, and polycarbonates. In some examples, the precursor material(s) employed to fabricate the substrate 38 are selected to have a high flow rate and/or a low viscosity during a molding process, such as injection molding. In other examples, the precursor material(s) employed to fabricate the substrate 38 are selected with higher viscosity levels based on cost or other considerations when a less viscosity-dependent process is employed, such as insert molding. According to another example, ultraviolet light-resistant materials and/or treatments may be employed in the substrate 38 to enhance its resistance to ambient light-related degradation. The substrate 38 can take on any of a variety of shapes, depending on the features of the panel 40, vehicle insignia, and other design considerations. For example, in some examples, one or more the surfaces of the substrate 38 are planar (e.g., faceted), non-planar, curved or characterized by other shapes. As also understood by those with ordinary skill in the field, the surfaces can be characterized with portions having planar features and portions having non-planar features.

The panels 40 may also be formed from a polymeric material (including thermoplastic and thermosetting polymeric materials), an elastomeric material, a metallic material, combinations thereof, and/or any other material known in the art. The panels 40 may be transparent and/or translucent and have a decorative layer 68 disposed thereon. As will be described in greater detail below, the light source 58 may be disposed between the panels 40 and the substrate 38. When the light sources 58 are activated, the panel 40 may emit light produced within the cavity 54 through the panel 40. In some examples, the substrate 38 may define a channel 71 that aligns with one or more of the panels 40. A rearwardly surface of the channel 71, or any other surface of the channel 71, may include a reflective mask 70 thereon to redirect light emitted from the light source 58 through the panel 40. In a nonactivated state, the decorative layer 68 is configured to control or modify an appearance of the panel 40, and consequently, the grille assembly 28. Once the light source 58 is activated, the emitted light 24 is transmitted through a portion of the panel 40 in a predefined manner to confer a desired appearance or message therefrom.

In various examples, the decorative layer 68 may confer a plurality of various patterns, textures, colors, etc. to various portions of the panel 40. The decorative layer 68 can be disposed on an interior and/or an exterior surface of the panel 40 through any method known in the art, including, but not limited to, sputter deposition, vacuum deposition (vacuum evaporation coating), electroplating, and/or printing onto the panel 40. The decorative layer 68 may be chosen from a wide range of materials and/or colors, including, but not limited to, silver, chrome, copper, bronze, gold, or any other colored surface. Additionally, an imitator of any metallic material may also be utilized without departing from the teachings provided herein.

In various examples, the decorative layer 68 may have a textured or grained surface. The grained surface may be produced on various portions of the panel 40 and may provide for the panel 40 to have a varied or common appearance with proximately disposed components of the vehicle 30. According to some examples, the substrate 38 may also have a decorative layer 72 that may be common with the panel 40 and/or different from the panel 40.

The diffuser 56 is disposed rearwardly of the panel 40. The diffuser 56 may be configured as a one or two side diffuser film that is designed to break up and distribute light to assist in minimizing hot spots and shadows. The diffuser 56 may have any desired light transparency and haze. For example, the diffuser 56 may have a light transparency between 30% and 95% and a haze that may be above 70%, particularly above 75%, and more particularly 80% or above.

With further reference to FIG. 4, the panel 40 and the substrate 38 may at least partially encompass a circuit board 74 and the light sources 58. The circuit board 74 may be configured as a printed circuit board (PCB) that is operably coupled to the controller 60 and include control circuitry including LED drive circuitry for controlling activation and deactivation of the light sources 58. The controller 60 may be disposed in the vehicle 30 and/or within the grille assembly 28. The circuit board 74 may be configured in any fashion known in the art including, but not limited to, any flexible PCB and/or rigid PCB. The controller 60 may activate the light sources 58 based on a plurality of inputs and may modify the intensity of the light emitted by the light sources 58 by pulse-width modulation, current control, and/or any other method known in the art. In various examples, the controller 60 may be configured to adjust a color and/or intensity of light emitted from the light sources 58 by sending control signals to adjust an intensity or energy output level of the light sources 58.

The light sources 58 may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the lighting device 18. Further, various types of LEDs are suitable for use as the light sources 58 including, but not limited to, top-emitting LEDs, side-emitting LEDs, and others. Moreover, according to various examples, multicolored light sources 58, such as Red, Green, and Blue (RGB) LEDs that employ red, green, and blue LED packaging may be used to generate various desired colors of light outputs from a single light source 58, according to known light color mixing techniques. In operation, the controller 60 may selectively control the light sources 58 such that one, all, or a portion of the light sources 58 can be activated at any given time.

According to some examples, the light sources 58 may be configured as an array or matrix 76 of light sources 58. While only some of the matrices 76 are shown, it is to be understood that the matrix 76 could include any number of light sources 58 in any orientation without departing the scope of the present disclosure. The controller 60 may selectively activate light sources 58 within the matrix 76 to provide various messages to onlookers of the vehicle 30. For example, a first message may be illuminated to warn pedestrians of the autonomous mode of the vehicle 30. Further, a second message may be provided to warn a pedestrian of the approaching vehicle 30 once the pedestrian, or another object, is detected. In some circumstances, persons proximate the vehicle 30 may not notice the vehicle 30 and/or be distracted, and the presence of the messages may provide additional notification to the proximate person of the vehicle 30. Moreover, the messages may be provided in low-light conditions, such as at night, to provide additional visibility of the vehicle 30 to pedestrians and cyclists proximate the vehicle 30. In some examples, the messages may be updated based on the operational mode of the vehicle 30 (e.g., manual or autonomous mode), the object detected (e.g., a first message may be provided to a cyclist and a second message may be provided for a pedestrian), and/or the circumstance upon which the vehicle 30 approaches the detected object. In additional examples, the name of a service utilizing the vehicle 30 may be illuminated within the grille assembly 28 when the vehicle 30 is used for such purposes. Additionally, and/or alternatively, the grille assembly 28 may provide a personalized message and/or the name of a vehicle occupant to direct an incoming occupant of a correct vehicle 30 to enter. Moreover, the matrix 76 may selectively illuminate in various colors to act as an emergency vehicle notification light. In some instances, the matrix 76 may illuminate in various patterns to provide unique or stylized illumination patterns to the vehicle 30.

With further reference to FIG. 4, the grille assembly 28 may include exterior sensors 78 and/or camera 80, or any other vision-based device. The camera 80 includes an image sensor having an area-type image sensor, such as a CCD or a CMOS image sensor and image-capturing optics (not shown), and captures an image of an imaging field of view 82 (FIG. 6) defined by the image-capturing optics. In some instances, the camera 80 is disposed within the cavity 54 and, thus, encapsulated between the panel 40 and the substrate 38 (which may be sealingly coupled to one another) to assist in preventing environmental degradation. The images may be analyzed to determine if the vehicle 30 is approaching an object and/or person.

Figure 6:
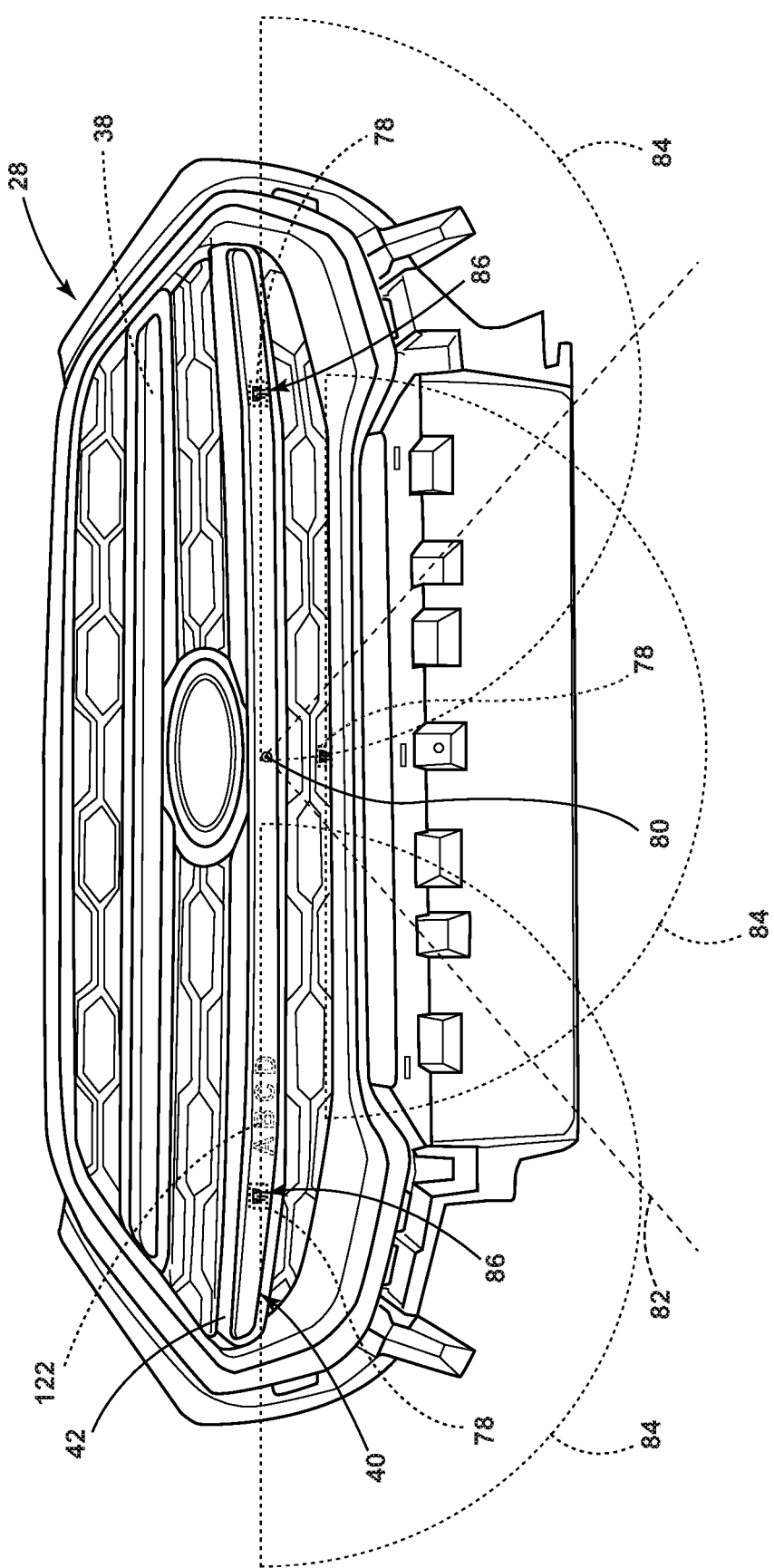
FIG. 6 is a front perspective view of the grille assembly in an unilluminated state, according to some examples.

In some examples, the exterior sensors 78 may also be encapsulated within the cavity 54 and may generate a detection field 84 (FIG. 6). The exterior sensors 78 may be configured as proximity sensors, such as an ultrasonic sensor, a radar sensor, a LIDAR sensor, and/or any other type of sensor known in the art. Each of the exterior sensors 78 may be formed by printed conductive ink 86 and/or by coupling preformed conductive circuitry to the panel 40 to encapsulate the sensor 78 between the panel 40 and the substrate 38. In other examples, the sensors 78 may be disposed on, or otherwise coupled with, the substrate 38 and may be electrically coupled with the circuit board 74. Each of the sensors 78 may be configured to detect a presence and/or movement of one or more vehicles, a person, an object, an obstruction, etc. and generate sensor data representative or indicative of a result of the detection. Each of the sensors 78 may be mounted on or otherwise coupled to a respective orientation mechanism. Each orientation mechanism may be configured to rotate, pivot, turn or otherwise change an angle or orientation of the respective sensor. That is, each orientation mechanism may include any mechanical, electrical, pneumatic and/or hydraulic components to effect the change in orientation of the respective sensor 78.

Figure 5:
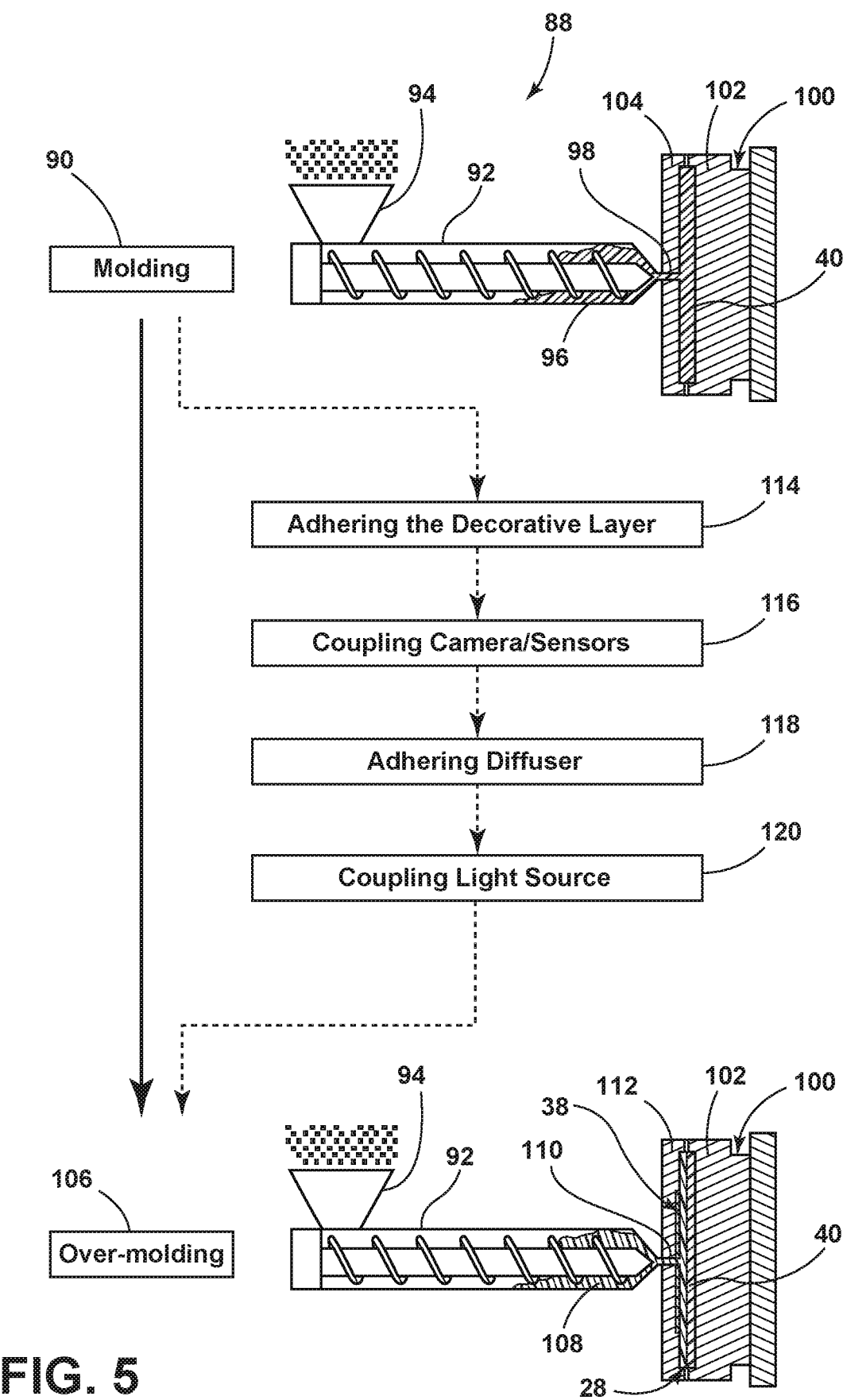
FIG. 5 is a flow chart schematic of a method of making the illuminated grille assembly, according to some examples.

Referring to FIG. 5, a method 88 of making the grille assembly 28 is depicted in a schematic flowchart, according to some examples. At step 90, the panel 40 is molded from a polymeric base. As shown in FIG. 5, an injection molding apparatus 92 with a hopper 94 for holding polymeric precursor material 96 can be employed to injection mold the panel 40. The injection molding apparatus 92 can be operated at a sufficient temperature to melt or otherwise promote flow of the precursor material 96 through an orifice 98 into the mold 100. The mold 100 includes two halves 102, 104. As the precursor material 96 is driven through the orifice 98 and into a cavity defined by the mold halves 102, 104, the mold 100 is cooled. Upon cooling in the cavity, the precursor material 96 is formed into the panel 40. At this point, the mold halves 102, 104 are separated and the panel 40 is removed.

Referring again to FIG. 5, the method 88 of making the grille assembly 28 also includes a step 106 of overmolding the substrate 38 over at least a portion of the panel 40 formed. As shown in FIG. 5, the injection molding apparatus 92 with a hopper 94 for holding polymeric precursor material 108 can be employed to injection mold the overmolded element, e.g., the substrate 38. In particular, the injection molding apparatus 92 can be operated at a sufficient temperature to melt or otherwise promote flow of the precursor material 108 through an orifice 110 into the mold 100. The mold 100 includes two halves 102, 112. As the precursor material 108 is driven through the orifice 110 and into a cavity defined by the mold halves 102, 112, the mold 100 is cooled. Upon cooling in the cavity, the precursor material 108 is formed into the substrate 38 that is operably coupled with the panel 40. At this point in step 106, the mold halves 102, 112 are separated and the grille assembly 28 containing the panel 40 and the substrate 38 is removed as a unitary component. Due to fabrication and assembly steps being performed inside a mold, molded multi-material objects may allow a reduction in assembly operations and production cycle times. Furthermore, the product quality can be improved, and the possibility of manufacturing defects and total manufacturing costs can be reduced.

According to some aspects of the method 88 for making the grille assembly 28, as shown in FIG. 5, the method 88 may further include one or more additional steps that may be performed in any order, such as adhering a decorative layer to the panel 40 at step 114, coupling the camera 80 and/or the sensor 78 to the panel 40 at step 116, adhering the diffuser 56 to the panel 40 at step 118, and/or coupling the light sources 58 to the panel 40 at step 120.

In some examples, the decorative layer 68 may be configured as a film that is disposed within the mold 100 prior to molding of the panel at step 90. The film may be preformed into a desired shape and positioned within the mold in a desired orientation. In some examples, the film may be thermoformed, vacuum formed, or otherwise molded prior to insertion into the mold 100. As provided herein, the film may be disposed outwardly of the panel 40 and confer any desired appearance to all, or a portion, of the member once the member, and consequently, the grille are disposed on the vehicle. In other examples, the adhering of the decorative layer 68 at step 114 can include the deposition of one or more materials capable of being deposited through conventional technologies to confer a desired appearance to the panel 40. In some aspects, the decorative layer 68 can be fabricated from materials suitable for achieving a bright chrome, satin nickel, satin chrome, satin aluminum, gold, copper, silver, bronze and other finishes. These materials employed for plating can include one or more metals, e.g., nickel, chromium, aluminum, gold, silver, and others. In any case, the panels 40 may continue to be translucent once the decorative layer 68 is disposed on the panels 40.

According to some examples, the camera 80 and/or the sensors 78 are coupled with the panel 40 at step 116. The camera 80 and/or the sensors 78 may be adhered to the panel 40 through any process known in the art. For example, optically clear adhesives may be utilized for positioning the camera 80 and/or sensors 78 in a desired position. As used herein, the term "optically clear" refers to an adhesive that has a high light transmittance over at least a portion of the visible light spectrum (about 400 to about 700 nanometers), and that exhibits low haze. Both the luminous transmission and the haze can be determined using, for example, the method of ASTM-D 1003-95. In some examples, the adhesive has about 10% haze or less, particularly about 5% haze or less, and more particularly about 2% haze or less.

In some examples, the sensors 78 may be formed with conductive ink 86 or may alternatively be formed with flex circuitry. In some instances, the sensors 78 may be configured as an ink 86 that is coated on the panel 40 by conventional screen printing, flexographic printing, or gravure printing. In some examples, the ink 86 is flexible and can be applied directly to or transferred onto the panel 40. The flexible, conductive ink 86 may be moved as the panel 40 flexes and/or changes in size without breaking and while maintaining a stable set of electrical properties such as conductance over time and use. Additionally, the ink 86 may be disposed in a flexible ink pattern and/or a stretchable insulator may be disposed over/surrounding the conductive ink 86. The stretchable, conductive ink 86 may include a percentage of conductive material (e.g., around/approximately 20%, 25%, 30%, 35%, 40%, 45%, 50%, 55%, 60%, 65%, 70%), and a binder (e.g., acrylic binder that is formaldehyde-free), a thickener (e.g., polyurethane thickener) and a humectant and/or solvent (e.g., propylene glycol). The flexible ink 86 may be configured to generally meet a minimum conductance as well as a minimum stretching property.

In general, the flexible ink 86 may have a stretchability ranging from 5% to 200%, e.g., it may be stretched more than two times (200%) of its at-rest length without breaking. In some examples, the flexible ink 86 can be stretched to more than three times (300%), more than four times (400%), or more than five times (500%) of its neutral, at-rest length. The flexible ink 86 is conductive and may have a low resistivity. Structurally, the flexible ink 86 described herein may be made from a specified combination of an insulative adhesive and a conductive material. In general, a flexible ink 86 may include a first (or base) layer of insulative and elastic adhesive and a layer of the conductive material, where the conductive material includes between about 40% and about 60% of conductive particles (e.g., carbon black, graphene, graphite, silver metal powder, copper metal powder, or iron metal powder, etc.).

With further reference to FIG. 5, at step 118, the diffuser 56 is adhered to the panel 40. Accordingly, the diffuser 56 is disposed between the panel 40 and the light sources 58. The diffuser 56 may be configured as a film or a material that may be disposed on the panel 40 through any process known in the art.

Referring still to FIG. 5, the light sources 58 are coupled with the panel 40 in a desired position at step 120. In some examples, the light sources 58 may be configured as a matrix 76 of light sources 58. The light sources 58 may be disposed on the circuit board 74. Once the substrate 38 is molded onto the panel 40, the light sources 58 and circuit board 74 may be encapsulated between the panel 40 and the substrate 38. In some examples, the encapsulation of the light sources 58, the circuit board 74, the camera 80, and/or the sensors 78 may protect such components from the environmental contaminants, such as dirt and water that may come in contact with the body structure 32 of the vehicle 30. The encapsulation of the components may also protect such components from environmental temperature changes due to ambient temperatures and/or heat produced by the vehicle 30 during operation thereof.

In other examples, the substrate 38 may be formed in a first manufacturing step and any of the components described herein may be disposed on the substrate 38 prior to overmolding the panels 40 without departing from the scope of the present disclosure.

Figure 7:
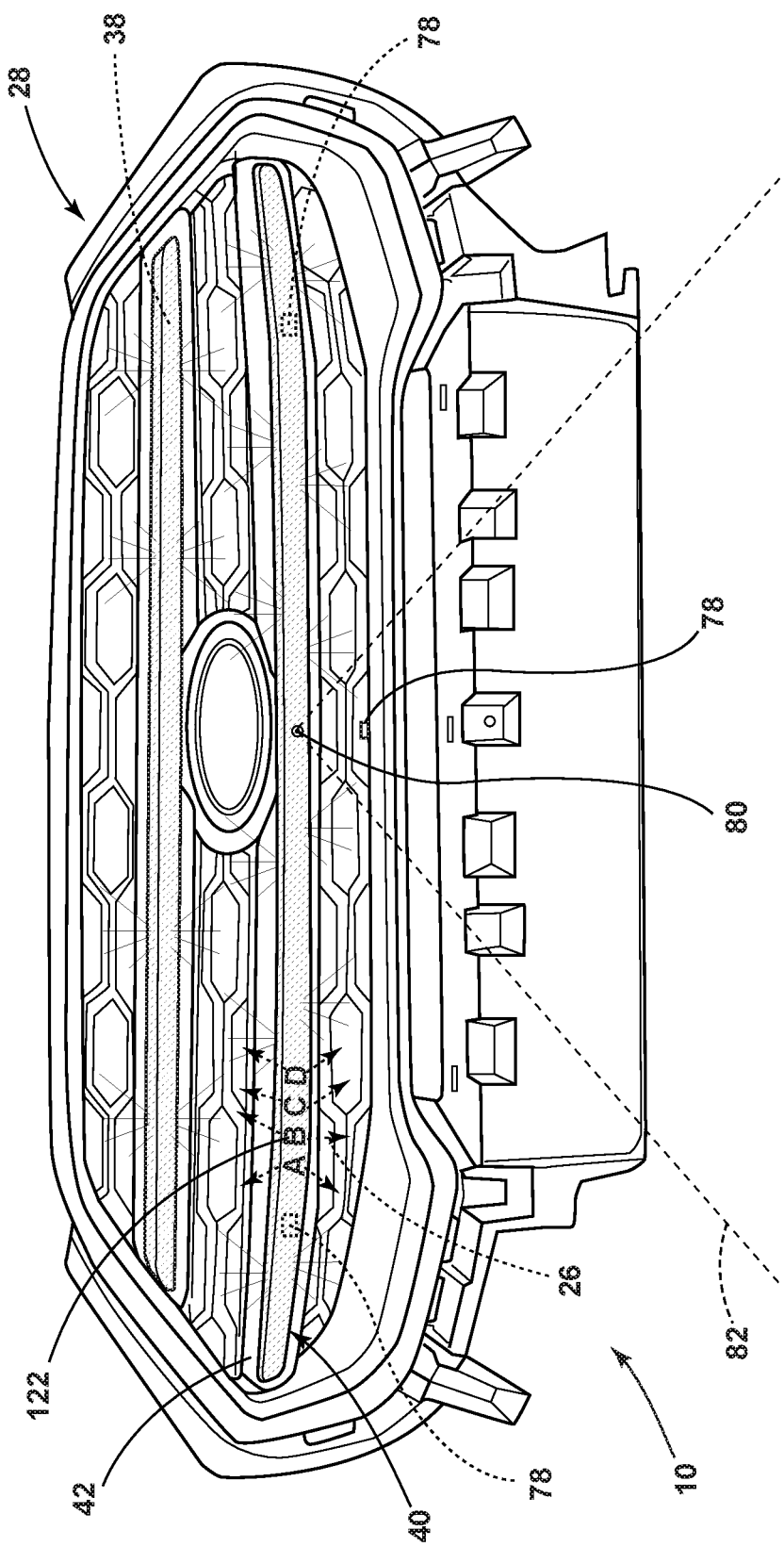
FIG. 7 is a front perspective view of the grille assembly in an illuminated state and having the luminescent structure on the panel, according to some examples.

Referring to FIGS. 6 and 7, when the light sources 58 are deactivated, the panels 40 may confer a desired appearance that is defined by the decorative layer 68 and/or a color of the precursor material forming the panel 40 and the substrate 38. Moreover, in the deactivated state, the sensors 78 and/or indicia 122 may be substantially concealed.

As illustrated in FIG. 7, once the light sources 58 are activated, the panel 40 may provide additional illumination forwardly of the vehicle 30. The additional illumination may be within the field of view 82 of the camera 80 thereby enhancing the ability of the camera 80 to detect various objects forwardly of the vehicle 30 in low light conditions. In some examples, the camera 80 and the exterior sensors 78 can assist in detecting road obstructions, such as potholes, debris, railroad tracks, etc. In response to detecting a road obstruction, the vehicle 30 may warn a driver and/or occupants of the vehicle 30 of the approaching obstruction or perform mitigating actions, such as redirecting the vehicle 30 to miss the obstruction and/or reducing the speed of the vehicle 30 prior to reaching the obstruction.

With further reference to FIG. 7, the indicia 122 may not be readily visible when the light sources 58 is in an unilluminated state and visible when the light sources 58 is illuminated. In some instances, the luminescent structure 10 may form the indicia 122 that define one or messages, an emblem 46 (FIG. 2), a logo, an artistic design (e.g., a cat's eye) or any other desired information that may be visible when the luminescent structure 10 is in a luminescent and/or non-luminescent state. In operation, the luminescent structure 10 receives the excitation light from the light sources 58 and, in response, luminesces. According to various examples, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending a first wavelength with a second wavelength.

Figure 8:
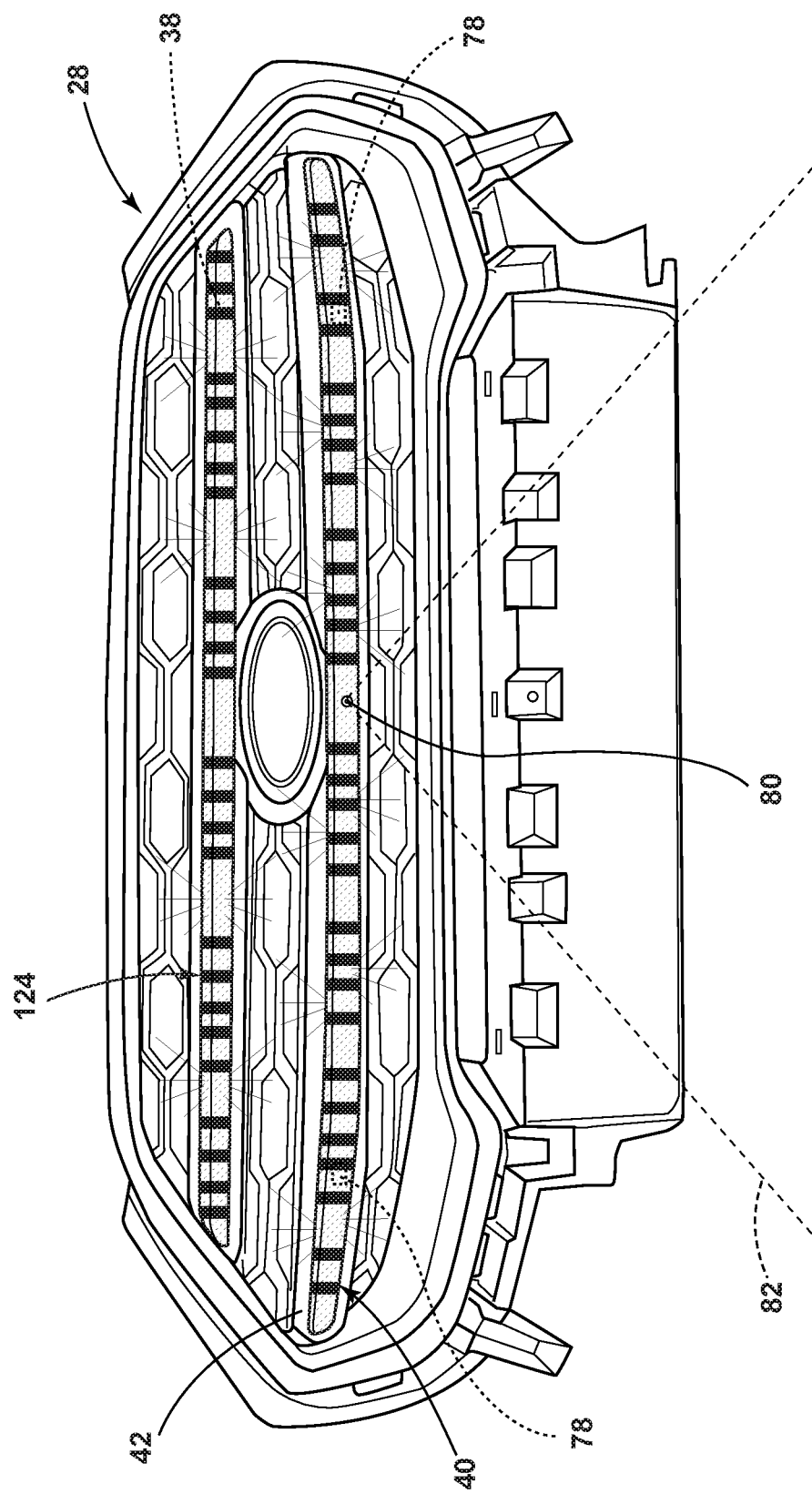
FIG. 8 is a front perspective view of the grille assembly in an illuminated state and generating an image code, according to some examples.

With reference to FIG. 8, the grille assembly 28 may illuminate various portions of the panel 40 to create a code image 124. To interpret such a code image 124 containing information, a decoder may be used. The code image 124 may be a one-dimensional barcode such as a universal product code (UPC) and a European Article Number (EAN), and a two-dimensional code such as a color code, a gray code, a Quick Response (QR) code, a PDF-417 code, a data matrix, combinations thereof, and/or any other type of code image 124. Information may be obtained by recognizing an image and extracting the information from the image using a technology of recognizing the information provided in the code image 124.

The image code may be readable by the electronic device 50 (FIG. 2) to conceal the name and/or identity of the incoming occupant of the vehicle 30. Moreover, the code image 124 may be used in circumstances in which various vehicles communicate with one another. Additionally, and/or alternatively, the code images 124 may be used within fleet situations as an identifier of the vehicle 30 that is recognizable through various systems, including imaging systems.

Figure 9:
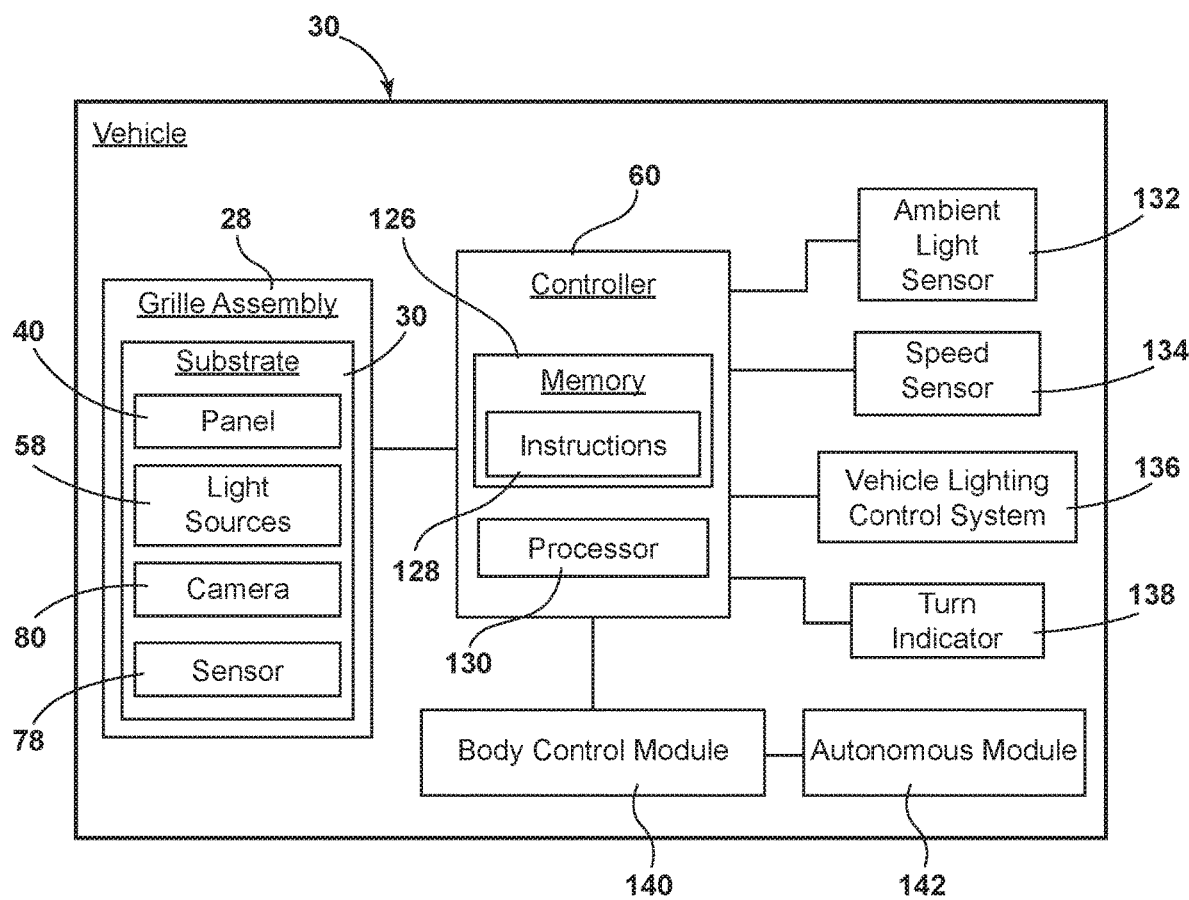
FIG. 9 is a block diagram of the illuminated grille assembly, according to some examples.

Referring to FIG. 9, the light sources 58 of the grille assembly 28 are operably connected to a controller 60 and may correspond to a standalone controller or may be otherwise integrated with an existing vehicle system. The controller 60 includes a memory 126 having instructions 128 stored thereon that are executable by a processor 130. The instructions 128 may generally relate to ways in which to operate the light sources 58 to ultimately affect the manner in which the grille assembly 28 illuminates or luminesces. The controller 60 may also communicate with other vehicle devices such as, but not limited to, an ambient light sensor 132, a speed sensor 134, a vehicle lighting control system 136, a turn indicator 138, as well as a body control module 140 of the vehicle 30. By leveraging these vehicle devices, the grille assembly 28 may provide a variety of functional lighting. For example, the grille assembly 28 may provide one or more messages to onlookers of the vehicle based on the specific light sources 58 illuminated within a matrix 76, through backlit indicia 122 on the panel 40, and/or through excitation of one or more luminescent structures 10 disposed on the panel 40. In addition, the grille assembly 28 may illuminate as a supplemental daytime running lamp, a hazard light, or a turn signal. Additionally, the grille assembly 28 may be illuminated during a welcome or departure event when a user unlocks or locks the vehicle 30. While a few specific examples have been provided herein, it will be apparent to those of ordinary skill in the art that the grille assembly 28 may be illuminated to provide other types of functional lighting.

Referring still to FIG. 9, an autonomous module 142 may be in communication with the BCM 140. In some examples, the vehicle 30 may be trained or otherwise programmed using machine learning tools (e.g., deep neural networks) and the processor 130 may maneuver in an autonomous operation via vehicle control interface. For example, the machine learning tool may be a software program stored in the memory 126 as part of one or more instructions 128 and, thus, the processor 130 may execute the one or more instructions 128 for the learning. The processor 130 may also provide signals to various vehicle components for maneuvering the vehicle 30. Additionally, the processor 130 may be configured to receive and update the one or more instructions 128. In response, the autonomous module 142 may control various components of the vehicle 30, e.g., a steering wheel, brake pedal, accelerator pedal, gearshift lever, etc. to operate the vehicle 30 without some, or any, operator input.

A variety of advantages may be derived from the use of the present disclosure. For example, use of the disclosed grille assembly provides a unique aesthetic appearance to the vehicle. Moreover, the grille assembly may provide lighting forwardly and/or outward of the vehicle. In some examples, the grille assembly may be illuminated to provide messages and/or information to onlookers of the vehicle. The grille assembly may also be illuminated to provide additional light to a user of the vehicle and/or a user of any feature of the vehicle, such as a camera disposed on the vehicle. The grille assembly may include a substrate and a panel that are sealingly coupled to one another through a multi-step molding process. The grille assembly may be manufactured at low costs when compared to standard vehicle lighting assemblies.

According to various examples, a vehicle grille assembly is provided herein. The vehicle grille assembly includes a panel coupled to a substrate and defining a cavity therebetween. A light source is disposed within the cavity. A diffuser is disposed between the light source and a portion of the panel. Examples of the vehicle grille assembly can include any one or a combination of the following features:
   the diffuser is disposed on an internal surface of the panel;
   the light source is configured as a matrix of light sources that independently and selectively activate;
   the light source is provided on a printed circuit board that is disposed along a channel defined by the substrate;
   a camera disposed between the substrate and the panel;
   a sensor disposed between the substrate and the panel;
   the sensor is formed from a flexible ink that is disposed on an internal surface of the panel;
   indicia disposed on the panel, wherein the indicia are not readily visible when the light source is in an unilluminated state and visible when the light source is illuminated;
   the light source illuminates an area within a field of view of the camera when the light source is illuminated;
   the light source selectively illuminates to form various image codes, the image codes readable by an electronic device separated from a vehicle having the substrate affixed thereto;
   a controller selectively activates the light sources within the matrix to provide various messages to onlookers of a vehicle; and/or
   the indicia are defined by a luminescent structure.

According to some examples, a vehicle grille assembly is provided herein. The vehicle grille assembly includes a panel sealingly coupled to a substrate and defining a cavity therebetween. A matrix of light sources is disposed within the cavity configured to illuminate various messages. A diffuser is disposed between the light source and a portion of the panel. Examples of the vehicle grille assembly can include any one or a combination of the following features:
   a camera disposed between the substrate and the panel.

Moreover, a method of making a grille assembly is provided herein. The method includes molding a panel that is formed from a polymeric, translucent material. The method also includes fixing a matrix of light sources along the panel. The method further includes overmolding a substrate over the panel, the substrate and the panel at least partially sealing the matrix of light sources therebetween. Examples of the method can include any one or a combination of the following additional steps/features:
   adhering a decorative layer to the panel;
   the panel is formed from a translucent material;
   coupling at least one of a camera and a sensor to the panel;
   coupling a diffuser to an internal surface of the panel; and/or
   the molding is conducted such that the polymeric substrate is tinted and comprises a polymeric material selected from a group consisting of an acrylic, a polycarbonate, a polypropylene, a nylon, an acrylonitrile styrene acrylate and combinations of these polymeric materials.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions include, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer useable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle grille assembly comprising:
   a panel coupled to a substrate and defining a cavity therebetween;

a light source disposed within the cavity, wherein the light source selectively illuminates to form various image codes, the image codes readable by an electronic device separated from a vehicle having the substrate affixed thereto; and a diffuser disposed between the light source and a portion of the panel.

2. The vehicle grille assembly of claim 1, wherein the diffuser is disposed on an internal surface of the panel.

3. The vehicle grille assembly of claim 1, wherein the light source is configured as a matrix of light sources that independently and selectively activate.

4. The vehicle grille assembly of claim 1, wherein the light source is provided on a printed circuit board that is disposed along a channel defined by the substrate.

5. The vehicle grille assembly of claim 4, further comprising:

a camera disposed between the substrate and the panel, wherein the light source selectively illuminates a field of view of the camera.

6. The vehicle grille assembly of claim 1, further comprising:

a sensor disposed between the substrate and the panel.

7. The vehicle grille assembly of claim 6, wherein the sensor is formed from a flexible ink that is disposed on an internal surface of the panel.

8. The vehicle grille assembly of claim 1, further comprising:

indicia disposed on the panel, wherein the indicia are not readily visible when the light source is in an unilluminated state and visible when the light source is illuminated.

9. The vehicle grille assembly of claim 1, wherein the light source illuminates an area within a field of view of a camera when the light source is illuminated.

10. The vehicle grille assembly of claim 3, wherein a controller selectively activates the light sources within the matrix to provide various messages to onlookers of a vehicle.

11. The vehicle grille assembly of claim 8, wherein the indicia are defined by a luminescent structure.

12. A vehicle grille assembly comprising:

a panel sealingly coupled to a substrate and defining a cavity therebetween;

a matrix of light sources disposed within the cavity configured to illuminate various messages, wherein the various messages are based on at least one of an input from an electronic device separated from said vehicle grille assembly and an object sensed by a sensor; and a diffuser disposed between the light source and a portion of the panel.

13. The vehicle grille assembly of claim 12, further comprising:

a camera disposed between the substrate and the panel.

14. A method of making a grille assembly, the method comprising:

molding a plurality of panels that are each formed from a polymeric, translucent material;

fixing a matrix of light sources along each of the plurality of panels; and overmolding a substrate over the plurality of panels, the substrate defining alternating vanes and channels, wherein each of the plurality of panels aligns with one of the vanes, the substrate and the plurality of panels at least partially sealing each of the matrices of light sources therebetween.

15. The method according to claim 14, further comprising:

adhering a decorative layer to the panel; and applying a luminescent structure to the panel, the luminescent structure configured to convert emitted light received from the matrix of light sources and re-emit the light at a different wavelength.

16. The method according to claim 14, wherein the panel is formed from a translucent material.

17. The method according to claim 14, further comprising:

coupling at least one of a camera and a sensor to the panel, the substrate and the panel at least partially sealing the at least one of the camera and the sensor therebetween.

18. The method according to claim 14, further comprising:

coupling a diffuser to an internal surface of the panel.

19. The method according to claim 14, wherein the molding is conducted such that the polymeric substrate is tinted and comprises a polymeric material selected from a group consisting of an acrylic, a polycarbonate, a polypropylene, a nylon, an acrylonitrile styrene acrylate and combinations of these polymeric materials.

* * * * *